July 9, 1929.  R. SCHOLZ  1,720,097
DOUGH CUTTING MACHINE
Filed Jan. 25, 1927  2 Sheets-Sheet 1
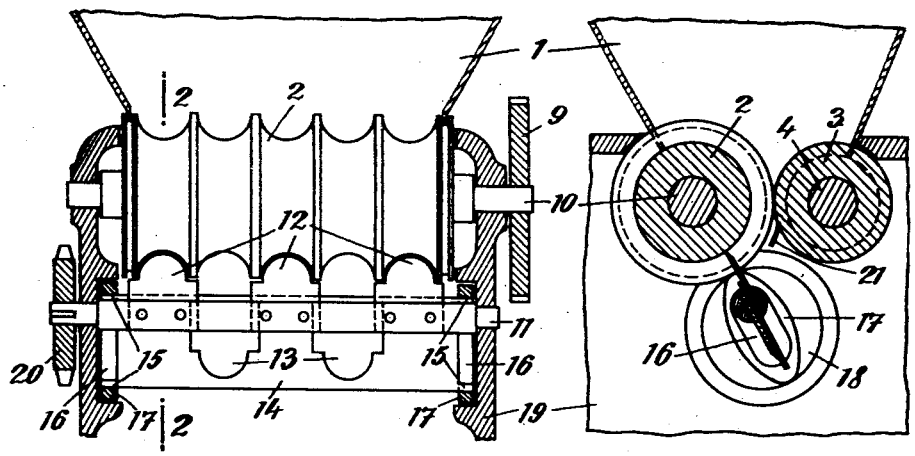
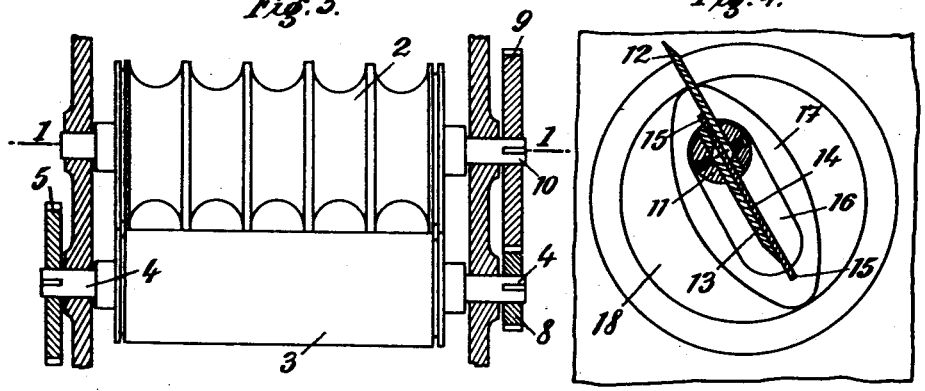
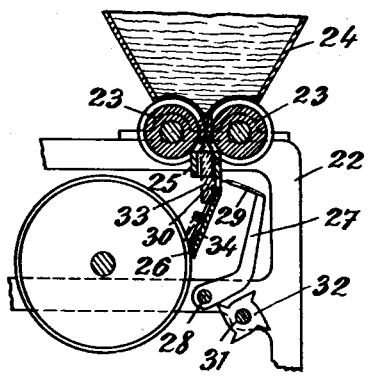
Inventor
Richard Scholz

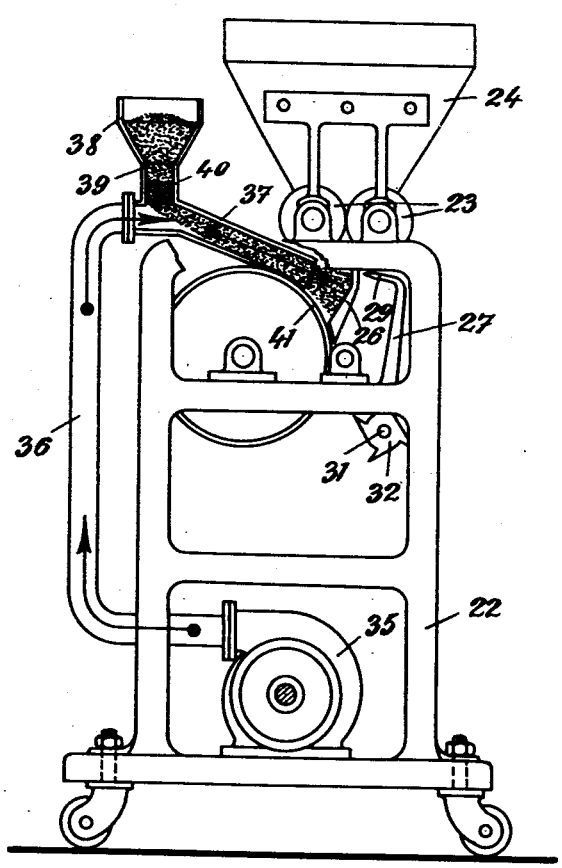

Patented July 9, 1929.

1,720,097

UNITED STATES PATENT OFFICE.

RICHARD SCHOLZ, OF KONIGSWUSTERHAUSEN/BERLIN, GERMANY, ASSIGNOR TO THE FIRM W. MARX & CO., OF HALLE-ON-THE-SAALE, GERMANY.

DOUGH-CUTTING MACHINE.

Application filed January 25, 1927, Serial No. 163,443, and in Germany March 16, 1925.

For cutting the dough into equal portions rotary knives of known type are used which are arranged on a cylinder displaced the one with regard to the other. These knives present the serious inconveniences that they do not cut perpendicularly into the dough string but obliquely, in accordance with their direction of rotation, so that the dough string is drawn along by the knife and stretched. The knives, when rotating, must therefore cut through to the table on which the dough string rests as otherwise the dough portions would not be completely separated from the string. The knives scrape fine wood fibres off the table which fibres get into the dough, and the knives become blunt very rapidly.

This invention obviates these inconveniences by arranging in the bottom end of the reservoir a fluted roll the dough being pressed into the flutes of the roll by a rapidly rotating smooth cylinder, the strings of dough being cut by rotating knives which are arranged in accordance with the grooves in the roll, a scraper slidable on said knives serving to scrape off the dough portions. This scraper slides alternately to and fro upon the knives, owing to the arrangement that two blocks which carry this scraper are eccentrically mounted on the ends of the knife cylinder and when circulating around the shaft rotate in a cavity of the casing in executing at the same time a shifting movement along the shaft. By means of a ratchet wheel which controls the rotation of the cylinders the feeding of the dough to the knives can be regulated accordingly. Instead of the rotating knife an oscillatable knife may be used for cutting the dough strings and two fluted rolls without a smooth cylinder may be arranged below the dough-reservoir. This knife when oscillating can cut through the dough strings so that perfect severing of the dough portions is ensured.

In order to prevent the dough from sticking on the knives at the cutting and at the further conveying and subsequent treatment of the same, all elements of the machine which come into touch with the dough are permanently and uniformly dusted with flour from a flour reservoir whereby a uniform treatment of the dough is ensured. The air current for blowing the flour is produced by a fan driven from the main shaft of the machine.

A dough cutting device with dusting by flour is illustrated, by way of example, in the accompanying drawings, in which:—

Fig. 1 is a section on line 1–1 of Fig. 3.
Fig. 2 is a section on line 2–2 of Fig. 1.
Fig. 3 is a top plan view of Fig. 1.
Fig. 4 shows the knife arrangement in section and on larger scale.
Fig. 5 shows in side elevation the ratchet mechanism for rotating the dough cylinders.
Fig. 6 shows in vertical section another form of construction.
Fig. 7 shows in side elevation, partly in section, the device for dusting with flour.

Underneath the dough reservoir 1 a fluted roll 2 is rotatably mounted. Under this fluted roll 2 a smooth cylinder 3 is rotatably arranged. On the shaft 4 of cylinder 3 a ratchet wheel 5 is keyed which can be rotated by a pawl lever 6 and connecting rod 7. The connecting rod 7 is operated from the main driving mechanism of the machine, for instance by a cam disk, crank or the like. The revolving speed of cylinder 3 can be regulated by adjusting the position of the connecting rod 7 on the pawl lever 6. On the other end of shaft 4 a pinion 8 is keyed which meshes with a spur wheel 9 keyed on shaft 10 of the fluted roll 2. A knife shaft 11 is journaled in the machine frame, underneath the roll 2 and cylinder 3, this knife shaft 11 having a continuous longitudinal slot continuously extending for a length corresponding with the length of the fluted roll 2. On the inner surfaces of the continuous slot knives 12 and 13 are fixed which extend in opposite directions and engage alternately with the flutes of roll 2 when the knife shaft 11 is rotating. Between the backs of the knives 12 and 13 extends a scraper 14 over the entire length of the slot. Studs 15 projecting from the ends of the scraper 14 are fixed each in a block 17, said blocks having oblong apertures 16. The blocks 17 which enclose the knife shaft 11 are rotatably mounted in cavities 18 of the frame walls 19, said cavities being eccentric with regard to the knife shaft 11. When rotating in the cavities 18 of the frame walls the blocks 17 execute at the simultaneous rotation of the knife shaft 11 a shifting movement on this knife shaft so that the scraper 14 slides to and fro upon the knives 12 and 13. The knife shaft 11 is driven from the main driving mechanism of the machine by a sprocket or toothed wheel 20.

The operation of the machine is as follows:—

When the smooth cylinder 3 is rotated by the ratchet wheel 6 the fluted roll 2 is rotated also through the intermediary of the pinions 8 and 9, this fluted roll rotating however more slowly than the smooth cylinder owing to the ratio of transmission. The dough which is supplied from the reservoir 1 onto the fluted roll 2 is pressed by the rapidly rotating smooth cylinder 3 into the flutes of said roll and a scraper 21, which is arranged on the cylinder 3, scrapes the dough off the cylinder and presses the same into the flutes of roll 2. As the knife shaft 11 is rotated at the same time by a sprocket wheel 20 the knives 12 and 13 corresponding with the flutes of roll 2 come alternately into engagement with these flutes and cut the strings of dough which come out from said flutes. As the knives 12 and 13, when rotating, draw along the scraper 14, this scraper is shifted to and fro between the knives owing to the eccentric mounting of the blocks 17 with regard to the knife shaft 11, the scraper scraping off the knives the cut off portions of dough so that they can drop down. The scraping prevents further the dough from sticking on the knives.

In the machine shown in Fig. 6 two fluted rolls 23 are rotatably mounted in a frame 22 and rotated in opposite directions by means of a toothed wheel gear or by other suitable means. Over these rolls 23 a dough reservoir 24 is arranged. A tubular guide 25 with inclined guiding surface 26 extends upwards from below between said two rolls 23. Two or more set off levers 27 are fixed on an axle 28 and carry each on the top end a knife 29. In the tubular guide 25 a slot 30 of the length and height of the knives 29 is arranged so that the knives when oscillating can penetrate through the slot 30. The oscillating movement of the knife 29 is produced for instance by a cam disk 32 fixed on an axle 31 adapted to be rotated by gear wheels, sprocket wheel gear or the like, so that the cams of the cam disk make the levers 27 oscillate so that the knife 29 is alternately advanced through and withdrawn from the slot 30. The backward oscillation of the knife is due to gravity. Other known means, as pull springs or the like, may be provided for accellerating the return of the knife.

The fluted rolls 23, when rotating, form several strings from the mass of dough supplied from the reservoir 24, said dough strings 33 passing through the tubular guides 25 upon the inclined surface 26. As the knife 29 oscillates permanently to and fro through the slot 30 portions 34 of equal size are continuously cut off by the knife 29 from the strings, these dough portions 34 slipping downward on the inclined plane 26, and they are delivered by an endless conveyor band for further treatment.

In the machine frame 22 a fan 35 is arranged, as shown in Fig. 7, which is operated from the main drive of the machine, for instance from an electro-motor. The pipe 36 of the fan 35 merges into a blow pipe 37 on which a flour reservoir 38 is mounted. In the outflow end 39 of the flour reservoir 38 a vane-wheel 40 is arranged which regulates the outflow of the flour into the blow pipe 37. The end of the blow pipe 37 is preferably flat according to the elements which have to be dusted with flour, branch tubes leading from said blow tube to other elements to be dusted with flour.

When the fan has been started the air current flows in the direction of the arrow through pipe 36 into the dusting tube 37, the flour from the reservoir 38 being supplied to said dusting tube 37 by the rotating vane wheel 40. The flour which drops into the tube 38 is blown in finely distributed state upon the elements of the machine so that the dough cannot stick on these elements.

As shown in Fig. 7 the dough cutting mechanism and the dough drum 41 for treating the cut off portions of dough constructed as described and shown in my patent application Ser. No. 163,444, now Patent No. 1,678,747, are strewn with flour, the dough being supplied to these elements from the dough reservoir by means of the rolls 23. The drum 41 serves for shaping the dough-portions which have been cut and delivers in downward direction the shaped dough portion after every rotation.

I claim:

1. A dough-cutting mechanism on doughing machines for the production of baker's ware, comprising in combination with a dough reservoir, a fluted roll underneath said reservoir, a smooth cylinder underneath said fluted roll, means for rotating said cylinder from the main drive of the machine, a transmission for rotating said fluted roll at lower speed than and in opposite direction as said smooth cylinder, a knife shaft underneath said roll and cylinder, knives extending in opposite directions mounted in said knife shaft, a scraper shiftably mounted between said knives, and means for rotating said knife shaft and for shifting said scraper along said knife shaft.

2. A dough-cutting mechanism on doughing machines for the production of baker's ware, comprising in combination with a dough reservoir, a fluted roll underneath said reservoir, a smooth cylinder underneath said fluted roll, means for rotating said cylinder from the main drive of the machine, a transmission for rotating said fluted roll at lower speed than and in opposite direction as said smooth cylinder, a knife shaft underneath said roll and cylinder, knives extending in opposite directions mounted in said knife shaft, a scraper shiftably mounted between said knives, blocks in which said scraper is journaled and which execute an eccentric rotating movement around said knife shaft for rotating said knife shaft and for shifting said scraper along said knife shaft.

3. A dough-cutting mechanism on doughing machines for the production of baker's ware, comprising in combination with a dough reservoir, a fluted roll underneath said reservoir, a smooth cylinder underneath said fluted roll, a ratchet wheel, and a connecting rod adjustably connected to said ratchet wheel, for rotating said cylinder from the main drive of the machine, a transmission for rotating said fluted roll at lower speed than and in opposite direction as said smooth cylinder, a knife shaft underneath said roll and cylinder, knives extending in opposite directions mounted in said knife shaft, a scraper shiftably mounted between said knives, and means for rotating said knife shaft and for shifting said scraper along said knife shaft.

In testimony whereof I affix my signature.

RICHARD SCHOLZ.